United States Patent
Klausing et al.

(10) Patent No.: US 6,509,862 B2
(45) Date of Patent: Jan. 21, 2003

(54) METHOD OF SIGNAL TREATMENT AND PROCESSING USING THE ROSAR SYSTEM

(75) Inventors: Helmut Klausing, Hochstadt (DE); Horst Kaltschmidt, Neubiberg (DE)

(73) Assignee: EADS Deutschland GmbH, Munich (DE)

( * ) Notice: Subject to any disclaimer, the term of this patent is extended or adjusted under 35 U.S.C. 154(b) by 0 days.

(21) Appl. No.: 10/050,893

(22) Filed: Jan. 18, 2002

(65) Prior Publication Data

US 2002/0135505 A1 Sep. 26, 2002

(30) Foreign Application Priority Data

Jan. 18, 2001 (DE) .......................................... 101 01 991

(51) Int. Cl.[7] .............................................. G01S 13/90
(52) U.S. Cl. ........................................... 342/25; 342/91
(58) Field of Search .............................. 342/25, 65, 91, 342/175, 418; 343/705, 708, 874, 880, 883, 901

(56) References Cited

U.S. PATENT DOCUMENTS

| | | | | |
|---|---|---|---|---|
| 5,465,142 A | * | 11/1995 | Krumes et al. | 356/5.01 |
| 5,777,573 A | * | 7/1998 | Klausing et al. | 342/25 |
| 5,900,833 A | * | 5/1999 | Sunlin et al. | 342/22 |
| 6,255,980 B1 | * | 7/2002 | Matthews | 342/22 |

FOREIGN PATENT DOCUMENTS

| | | |
|---|---|---|
| DE | 3922086 | 10/1990 |
| DE | 4323511 | 1/1995 |
| EP | 494092 A | * 10/1996 |
| EP | 1004895 | 5/2000 |
| FR | 2686981 A | * 8/1993 |
| JP | 04026202 A | * 1/1992 |

OTHER PUBLICATIONS

"SIREV–Sector Imaging Radar for Enhanced Vision", Krieger, G.; Mattermayer, J.; Wendler, M.; Witte, F.; Moreira, A., Image an Signal Processing and Analysis, 2001. ISPA 2001. Proceedings of the 2nd International Symposium on, 2001, pp.: 377–382.*

"Observations of forests using a helicopter–borne nadir–looking radar; a new method for morphometric purposes", Bourdeau, M Dechambre, M., Geoscience and Remote–Sensing, IEEE Transactions on, vol.: 37 Issue: 4, Jul. 1999, pp. 2080–2091.*

"High resolution SAR/ISAR imaging from a helicopter platform", Barclay, M.W.; Williams, N.K., Radar 97 (Conf. Publ. No. 449) 1997, pp. 109–113.*

"Feasibility of a synthetic aperture radar with rotating antennas (ROSAR)", Klausing, H.; Keydel, W., Radar Conference, 1990. Record of the IEEE 1990 International, 1990, pp. 51–56.*

* cited by examiner

Primary Examiner—John B. Sotomayor
(74) Attorney, Agent, or Firm—Crowell & Moring LLP

(57) ABSTRACT

A method of signal conditioning and processing uses a ROSAR system for obtaining high-resolution elevation data using a fixed transmitting antenna, without requiring a turnstile. A telescope-like extensible transmitting antenna having large vertical dimensions illuminates an area to be imaged in a fanned pattern, creating overlapping elevation sectors. Reflected signals are relayed to a fixed receiving antenna via rotating transponders.

7 Claims, 2 Drawing Sheets

METHOD OF SIGNAL TREATMENT AND PROCESSING USING THE ROSAR SYSTEM

BACKGROUND AND SUMMARY OF THE INVENTION

This application claims the priority of German patent document 101 01 991.2, filed Jan. 18, 2001, the disclosure(s) of which is (are) expressly incorporated by reference herein.

This invention relates to a method of signal treatment and processing in a rotating synthetic aperture radar (ROSAR) system.

German patent documents DE 39 22 086 and DE 43 23 511 disclose a ROSAR system that operates on-line in near real time, and can be used not only in mapping, obstacle warning, and mine detection applications, but also for target reconnaissance and tracking, and for missile guidance. This ROSAR device is used at pulse frequency or in FM-CW operation, and operates in the cm- or in the mm-wavelength range. The present invention builds upon this state of the art.

In its operation, ROSAR is a side-looking radar, and thus supplies no elevation data. Up to now, a ROSAR has been implemented under the concept of "heliradar", using a turnstile that is specially designed for this purpose and is mounted on the rotor shaft of the helicopter. In order to obtain "rough" elevation data, transmitting and receiving antennas having low vertical dimensions have been provided on the turnstile, in order to achieve at least a compromise or tradeoff between a loss of aerodynamic flight performance and elevation angle resolution. While the degradation of flight performance caused by the turnstile is significant, experts have considered it tolerable in view of the all-weather vision that is gained.

The rough elevation resolution obtained in this manner is achieved by the radiation pattern of the transmitting and receiving antennas, which are fanned out to elevation angles. Because the elevation angle resolution that is achieved is related to the reciprocal of the antenna dimension (in this case, vertical), "vertical projections" at the tip of the turnstile (that tend to reduce flight performance) must be tolerated. In addition, there is the problem created by the need to transmit a large amount of electrical power from the fixed airframe of the helicopter to the rotating capstan handle.

As indicated above, known ROSAR signal treatment and processing methods obtain elevation data about the surrounding area to be imaged via vertically fanned transmitting and receiving antennas that are integrated into the ends of a turnstile. The turnstile rotates synchronously with the helicopter rotors. However, the integration of the vertically divided fanned transmitting and receiving antennas results in the above-mentioned vertical projections, which in turn result in the discussed reduction in flight performance. Added to this is the fact that a complicated rotary coupling is necessary to transmit the high-frequency transmitting energy from the helicopter airframe to the turnstile.

One object of the present invention is to provide a ROSAR method that will largely diminish the above-mentioned disadvantages of the current state of the art.

Another object of the invention is to provide such a method which will ensure high elevation resolution.

These and other objects and advantages are achieved by the method of signal conditioning and processing according to the invention, which achieves high resolution elevation data using a fixed transmitting antenna. For this purpose, a telescope-like extensible transmitting antenna having large vertical dimensions illuminates the area to be imaged in a fanned pattern, creating overlapping elevation sectors.

Other objects, advantages and novel features of the present invention will become apparent from the following detailed description of the invention when considered in conjunction with the accompanying drawings.

DETAILED DESCRIPTION OF THE DRAWINGS

In order to provide a ROSAR system having high resolution elevation data without need of an additional turnstile, in accordance with the invention, elevation data are obtained by illuminating the area to be imaged in a fanned pattern (FIG. 2, n=1 through n=4) using a fixed, telescope-like extensible antenna that is mounted in or on the body of the helicopter, and has large vertical dimensions, resulting in a high elevation resolution. This arrangement creates overlapping elevation sectors which can then be evaluated using known ROSAR signal treatment and processing methods.

The rod-type transmitting antenna support is provided with a longitudinal elementary antenna array, with the transmitting antenna support being much longer than it is wide. The fanned illumination is achieved through either mechanical or electronic beam oscillation. In the case of electronic beam oscillation, each of these elementary antennas is phase-controlled, so that a slewable multiple-beam antenna diagram is generated. As long as the helicopter remains on the ground in an idle or parked position, the telescoping antenna remains in a retracted state, in which it cannot come into contact with the ground. After take off and when a certain flying altitude is reached, then the antenna is extended to its full length.

The transmitting antenna then transmits broad-band signals in the various elevation sectors (n=1 through n=4), and the transit time to these elevation sectors is used to extract the distance to the surrounding objects via known methods. These broad-band signals are generally short pulses, or longer modulated pulses. In some situations, for example to reduce detectability by radar, pseudo-noise signals are advantageously used.

Reflected signals are received and converted by the transponder card that is mounted near the tips of the helicopter rotor blades, after which they are sent to a fixed receiving antenna; hence the necessity of the coherent synchronization of the transmitting and incoming signals in the transmitting and receiving process. Lateral resolution is obtained in accordance with state-of-the-art ROSAR technology, as discussed at the beginning.

Figure 1:
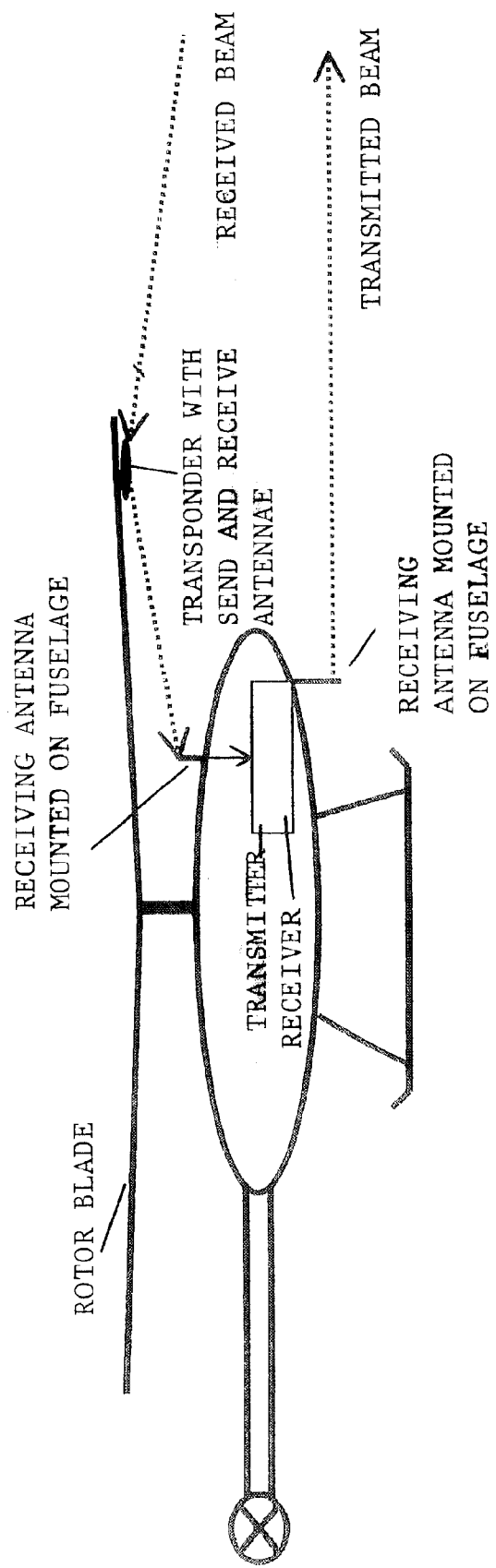
FIG. 1 is a schematic illustration of an exemplary embodiment of the entire arrangement according to the invention.
Figure 2:
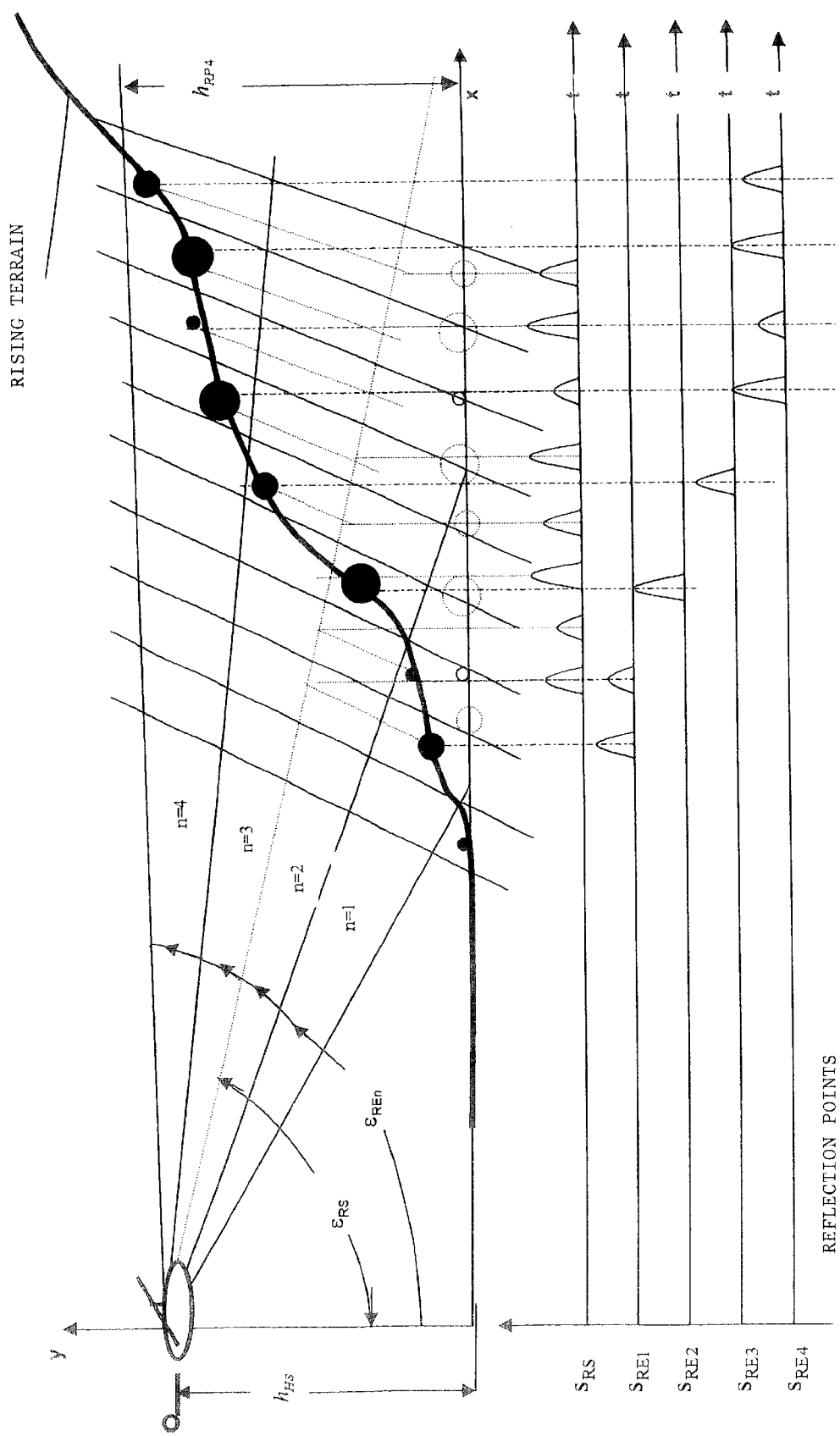
FIG. 2 is a graphic illustration of the acquisition of elevation data, and thus altitude information, of individual reflection points of the proposed method, in comparison with the current state of the art.

FIG. 2 illustrates the acquisition of elevation resolution. The rising terrain 20 with many different highly reflective reflection points 21, that cannot be recognized using state-of-the-art ROSAR methods, is illuminated. In state-of-the-art ROSAR methods, echo signals are received over only one channel; and because a level terrain is assumed, the reflection points are falsely interpreted as lying within a single plane. In contrast, however, the method according to the invention provides for multiple elevation channels (for example n=1 through n=4), so that the signals from the reflection points 21 that lie at different altitudes (FIG. 2) appear on different channels. For this purpose, the transmitting antenna illuminates the landscape at the various depression angles, one after the other. Synchronous with the various elevation angles, the incoming signal is directed to the various channels (n=1 through n=4) From the time of arrival of an echo signal in each elevation sector, the range R is extracted via known methods. The altitude $h_{RPn}$, of a reflection point is calculated as follows:

$$\frac{h_{HS} - h_{RPn}}{R} = \sin\left(\frac{\pi}{2} - \varepsilon_{Ren}\right)$$

and the desired altitude of the reflection point:

$$h_{RPn} = h_{HS} - R\sin\left(\pi/2 - \varepsilon_{Ren}\right)$$

The separately obtained radar data in a lateral and an elevation orientation are conditioned in the ROSAR processor such that, in addition to the classical lateral and range data, elevation data can be processed to form radar images. This is of great significance for military applications, especially for target reconnaissance and missile guidance.

The altitude and range data are acquired and processed in accordance with the principles of radar, with real apertures, via known methods. Additional altitude and range data on objects in individual elevation sectors are calculated from the shadow cast by the objects, using simple trigonometric laws.

Thus a ROSAR method is disclosed which requires no turnstile and no rotary coupling, achieves a particularly high elevation resolution, creates no vertical projections, and causes no aerodynamic degradation in flight performance.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a synthetic aperture radar system based upon rotating antennas using pulse frequency or FM-CW operation, or that is operated with pseudo-noise signals, and operates in the cm- or in the mm-wavelength range, to acquire high resolution elevation data, said method comprising:

a fixed, telescope-like extensible transmitting antenna having large vertical dimensions, which is permanently mounted on the body of the helicopter, illuminating an area to be imaged, in a fanned pattern of elevation angle sectors, via mechanical or electronic oscillation of the transmitting beam, thus creating overlapping elevation sectors that are then evaluated; and processing reflected radiation to achieve elevation data and horizontal position information.

2. The method in accordance with claim 1, wherein:

the extensible transmitting antenna comprises a longitudinal elementary array;

length of the array is substantially greater than its width; and the array is phase-controlled, such that an oscillating multiple-beam antenna diagram is generated.

3. The method in accordance with claim 1, wherein:

a transponder card is positioned near a tip of a rotor blade, which receives and converts reflected signals, and sends them on to a fixed receiving antenna; and transmitted and received signals are subject to coherent synchronization.

4. The method in accordance with claim 1, wherein the elevation data are processed to form radar images.

5. The method in accordance with claim 1, wherein data concerning the altitude of objects in individual elevation sectors are calculated trigonometrically from their shadow cast.

6. A rotational synthetic aperture radar device mounted in an aircraft, said device comprising:

a fixed transmitting antenna mounted on a body of said aircraft and being extensible from said body of said aircraft in a vertical orientation, for illuminating an area to be imaged, in a fanned pattern of elevation angle sectors which overlap vertically;

a plurality of transponders positioned proximate to tips of rotor blades of said aircraft for receiving reflected illumination;

a receiving antenna mounted on said aircraft body for receiving signals from said transponders indicative of received reflected illumination; and means for processing said signals to provide elevation data and horizontal position information.

7. The method in accordance with claim 6, wherein:

the extensible transmitting antenna comprises a longitudinal elementary array;

length of the array is substantially greater than its width; and the array is phase-controlled, such that an oscillating multiple-beam antenna diagram is generated.

* * * * *